E. LANGGUTH.
PROCESS OF TREATING MIXED SULFID ORES.
APPLICATION FILED SEPT. 11, 1913.

1,144,481. Patented June 29, 1915.

Sulfids of Zinc, Lead, Silver, [Iron].

Treatment with molten zinc chlorid

Zinc sulfid, lead chlorid, zinc chlorid, silver chlorid [Ferrous chlorid]

Treatment with limited quantity of zinc.

Silver-lead.    zinc sulfid, lead chlorid, zinc chlorid [Ferrous chlorid.]

Treatment with water.

Solid Zinc sulfid.

Solution.
Zinc chlorid.
Lead chlorid.
[Ferrous chlorid.]

Treatment with zinc.

Spongy lead.

Zinc chlorid.
[Ferrous chlorid.]

[Treatment with Zinc Oxid and Air.]

Zinc chlorid.    [Iron Oxyhydrate.]

WITNESSES
G. V. Rasmussen
John A. Ferguson

INVENTOR
ERICH LANGGUTH
BY
Briesen & Knauth
ATTORNEYS of mixed sulfid ores, of which the following is a specification.

UNITED STATES PATENT OFFICE.

ERICH LANGGUTH, OF NEERPELT, BELGIUM.

PROCESS OF TREATING MIXED SULFID ORES.

1,144,481. Specification of Letters Patent. Patented June 29, 1915.

Application filed September 11, 1913. Serial No. 789,344.

*To all whom it may concern:*

Be it known that I, ERICH LANGGUTH, a subject of the King of Prussia, and a resident of Neerpelt, in the Province of Limbourg, Belgium, have invented a new and useful and Improved Process of Treating Mixed Sulfid Ores, of which the following is a specification.

My invention relates to the extraction of silver and lead from mixed ores and especially such as contain lead and silver sulfids; such ores ordinarily containing zinc and iron sulfids.

The present invention is built up upon the known reaction by means of which the silver and lead sulfids are converted into chlorid by the action of molten zinc chlorid, or its equivalents, such as its double salts, upon the mixed sulfids as they exist in the mixed ores. Numerous difficulties were encountered in the processes heretofore known in connection with the economical extraction of silver and lead from the chlorids as they exist as the result of the above treatment. Electrolytic processes by means of which the metals are recovered have been tried but are inefficient from an economical standpoint. It has further been suggested to separate the fused melt mechanically from the solid residue, to dissolve it in hot water and recover the silver and lead of the water solution. A great part of the melt will be retained by the residues and soluble chlorids contained in this part of the melt must be extracted by hot water. During this extraction the silver chlorid in the water solution containing zinc blends will reconvert itself into the form of an insoluble silver sulfid, leaving zinc chlorid. This suggested process accordingly fails to result in a yield of silver. In another process the total lead and silver contents were reduced by zinc in the molten mass. This process was found favorable in some rare cases, but generally a great excess of zinc was wanted and a dross was formed which greatly disturbed the process. I have found that it is the presence of iron in the ores which has heretofore prevented an economically operative recovery of silver and lead in this process. The difficulty created by the presence of iron or iron combinations and particularly pyrites is found in the fact that iron chlorid is reduced to a metallic state by molten zinc and separates out in the form of a dross which contains iron, zinc, lead and, according to the nature of the ore, also copper, silver and gold. This dross is pulpy or pasty and where the iron constituent is relatively large, it is not fusible and cannot therefore be separated from the melt which contains the ore. The reduction of the iron salts takes place after the complete reduction of the silver and simultaneously with and after the reduction of the last reduced portions of lead chlorid and it can therefore be avoided entirely by adding the zinc to the melt in limited quantities sufficient to reduce the silver, and only a part of the lead. In this case no excess of zinc is wanted, as the amount of it corresponds exactly to the reduced quantities of lead and silver, and these metals can be extracted in a condition in which they are free from iron while the formation of the deleterious dross is avoided. The remaining part of lead can be extracted from the melt in any suitable way after dissolving the melt in hot water and separating the residues from the solution.

The experiments which I have conducted satisfy me that the prior assertion that lead chlorid is reconverted into sulfid or sulfate by the finely divided zinc sulfid is incorrect, since the process as above described by me permits of the separation of the total quantity of lead chlorid even from the finest slimes of zinc sulfid. This correction of existing conceptions removed one of the important obstructions to the working out of a successful process. The lead extracted from a water solution containing iron salts is free from iron as iron salts are not reduced to a metallic state by zinc in this solution.

The process which has been devised to take advantage of these observations is briefly the following: The mixed ore is treated with molten zinc chlorid, or a double salt of zinc and alkali: zinc is then added in quantities sufficient to extract the silver and a part of the lead and the molten mass of chlorid remaining, in which all the unaffected constituents of the ore, including the gangue associated therewith, are suspended, is poured into water, whereupon the mass breaks up into granules, the water becomes heated and immediate solution of the soluble constituents takes place. Among these constituents is lead chlorid. The solid matter and the liquid matter are now separated in any suitable manner, in which separation no loss of any kind can take place. From the liquid matter the lead chlorid may be in part separated out by crystallization and treated separately or the whole of the chlorid may be precipitated as spongy lead by means of zinc. The iron remains in the water solution as a dissolved chlorid. The iron constituent may be separated out of the solution in the form of an oxid, provided the solution is evaporated while admitting air. The production of the iron oxid can be hastened by adding zinc oxid. Accordingly, my process enables me not only to render the iron harmless but also to remove it from the salts of the melt so that the latter can be again employed for new operations.

My process is schematically illustrated in the accompanying drawings, the behavior of iron and its extraction, in case this metal is present in the original ore, being shown in brackets.

As above explained, the quantity of lead free from iron that can be recovered from the melt will depend to some degree upon the proportionate amount of iron content in the melt and the degree of dilution of the lead chlorid in the melt. It is accordingly advisable to test the ores that are to be treated both as to iron and as to lead contents before the process is started. If it is found that the ore contains a relatively small proportion of lead, the process should be carried out in such a way that no lead at all is precipitated in the melt, but that the total amount of lead is recovered in the water solution. In this case it is advantageous to add lead to the melt in order that this may take up the silver that is present, thus forming silver-lead and lead-chlorid. As the reduction of iron can only take place in a molten mass by the action of zinc, any reduction of iron is prevented in the present process, and the formation of dross and the disadvantages connected therewith are avoided.

Some of the main advantages of the present process will be found in the fact that it enables the operator to work up mixed sulfids of lead, zinc, and silver in spite of the fact that they contain iron; also that a useless addition of zinc to the melt for the reduction of iron and the alloying of zinc with iron is avoided; and finally, that it results in a greater degree of concentration of silver in lead so that the desilverizing process is materially cheapened since a large proportion of the lead can be recovered in the form in which it is free from silver.

I claim:

1. The process of treating sulfid ores containing silver, lead and iron which consists in treating said ores with molten zinc chlorid to form silver, lead and iron chlorids, adding to the melt a limited quantity of a suitable metal, approximately that required to reduce all of the silver, separating the silver from the melt, pouring the melt containing the lead and iron chlorids into water to form a solution containing lead and iron chlorids, and finally extracting the lead from said solution, substantially as and for the purpose described.

2. The process of treating sulfid ores, which consists in treating said ores with molten zinc chlorid, adding to the melt a limited quantity of zinc approximately that required to reduce the silver and only a part of the lead, separating said silver lead from the melt, then pouring the resultant molten mass into water and then extracting the lead from the solution, substantially as and for the purpose described.

3. The process of treating sulfid ores, which consists in treating said ores with molten zinc chlorid, adding to the melt a limited quantity of zinc approximately that required to reduce the silver and only a part of the lead, then pouring the resultant molten mass into water whereby the remaining lead constituents of the ore become dissolved, then separating the dissolved constituents from the undissolved residue, and then extracting the lead from the solution, substantially as and for the purpose described.

4. The process of treating sulfid ores, which consists in treating said ores with molten zinc chlorid, adding to the melt a limited quantity of zinc approximately that required to reduce the silver and only a part of the lead, then pouring the resultant molten mass into water whereby the remaining lead constituents of the ore become dissolved, then separating the dissolved constituents from the undissolved residue, maintaining said water solution in a warm condition until after the separation of the undissolved residue is completed, and then extracting the lead from the solution, substantially as and for the purpose described.

5. The process of treating sulfid ores, which consists in treating said ores with molten zinc chlorid, adding to the melt a limited quantity of zinc approximately that required to reduce the silver and only a part of the lead, then pouring the resultant molten mass into water and then extracting the lead from the solution in form of spongy lead by adding zinc thereto, substantially as and for the purpose described.

6. The process of treating sulfid ores, which consists in treating said ores with molten zinc chlorid, adding to the melt a limited quantity of zinc approximately that required to reduce the silver and only a part of the lead, then pouring the resultant molten mass into water and then extracting the lead from the solution and separating
5 the iron in the form of an oxid to purify the zinc chlorid so as to render it fit for further employment in repeating the process.

In testimony whereof I have hereunto set my hand in the presence of two subscribing witnesses.

ERICH LANGGUTH.

Witnesses:
    ALFRED HINTERLEITNER,
    OSCAR DEPNER.